April 18, 1939.    R. C. SCHLORF    2,154,871
VALVE AND COOLING MEANS THEREFOR
Filed May 18, 1937    2 Sheets-Sheet 1
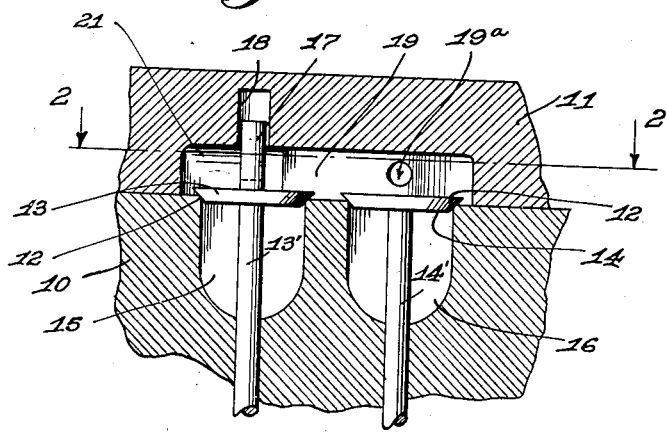
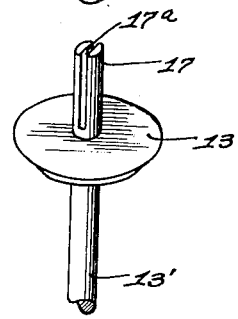
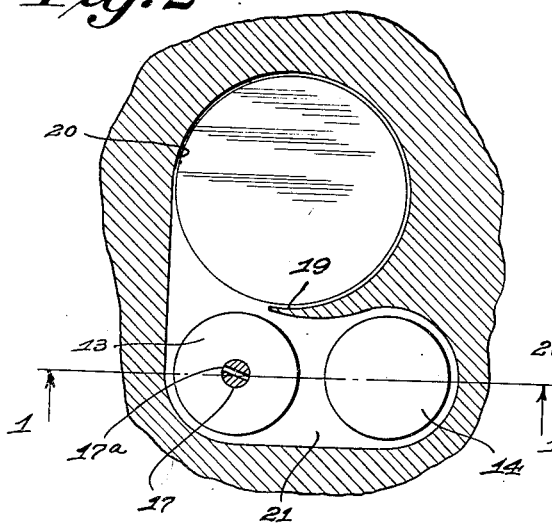
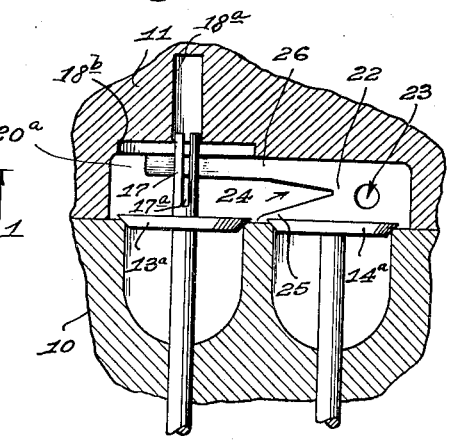
Raymond C. Schlorf
INVENTOR.
BY Edward D. Jones and
Eugene Stevens
ATTORNEYS.

April 18, 1939.   R. C. SCHLORF   2,154,871
VALVE AND COOLING MEANS THEREFOR
Filed May 18, 1937   2 Sheets-Sheet 2
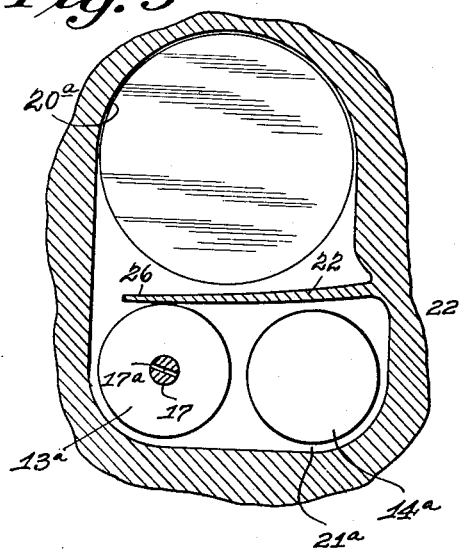
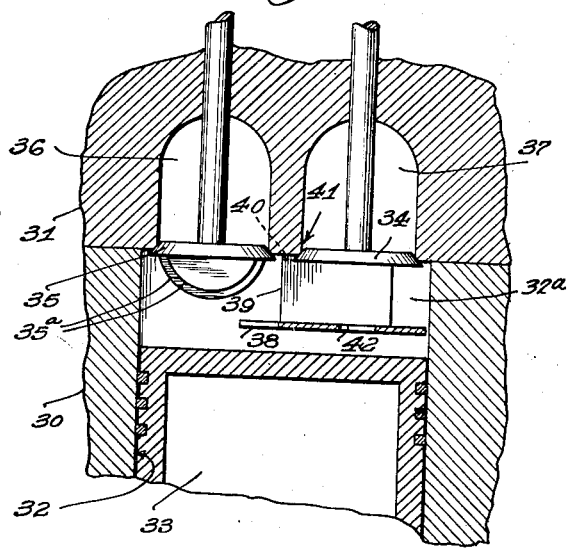
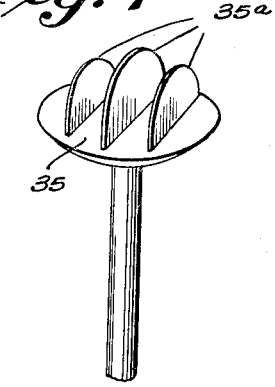
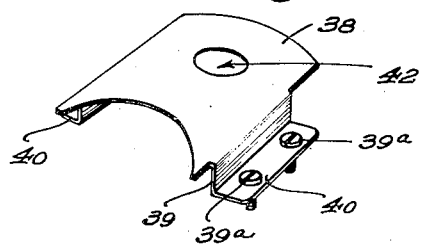
Raymond C. Schlorf
INVENTOR.
by Edward L. Jones and
Eugene Stevens
ATTORNEYS.

Patented Apr. 18, 1939

2,154,871

UNITED STATES PATENT OFFICE 2,154,871

VALVE AND COOLING MEANS THEREFOR

Raymond C. Schlorf, Chicago, Ill.

Application May 18, 1937, Serial No. 143,375

20 Claims. (Cl. 123—191)

My invention relates to improvements in internal combustion engines and has for its primary object to provide means for preventing overheating of at least certain of the valves and especially the exhaust valves thereof, whereby to minimize pitting, promote efficiency in operation and increase the life of same—without, however, diminishing engine efficiency in any other respects.

More specifically, it is an object of the invention to accomplish the aforementioned end by the provision of baffle-like means which may be carried either integrally or detachably with the engine head or block and arranged to direct at least a portion of the relatively cool intake gases over and in contact with the exhaust valve or valves for cooling the same.

Additionally it is an aim of the invention, in the accomplishment of the aforementioned ends, to provide at least certain valves—the exhaust valves, for instance, with heat disseminating means which will preferably be subjected to contact by the relatively cool intake gases and which may be arranged in a manner to transmit excess valve heat to the engine block and/or engine head.

The foregoing and other incidental objects and advantages of the invention, which will readily suggest themselves to those skilled in the art, are attained by means of novel features of construction, combination and arrangement of parts, modes and methods of operation to be hereinafter described and claimed, reference being had to the accompanying drawings forming a part of the specification.

In pursuance of the requirements of the patent statutes certain preferred examples of the invention have been illustrated in the accompanying drawings and will be dealt with in the following detailed description. However, it is to be understood that the invention is susceptible of other mechanical expression within the spirit and scope of the subject matter claimed hereinafter.

In the drawings wherein the same reference characters have been used to designate the same parts in all views:

Figure 1 is a fragmentary vertical sectional view through the head and block of an internal combustion engine illustrating companion intake and exhaust valves with the latter provided with a heat-radiating extension working in a recess in the engine head, the view being taken on the line 1—1 of Figure 2;

Figure 2 is a vertical sectional view taken on the line 2—2 of Figure 1;

Figure 3 is a fragmentary perspective view of the exhaust valve of Figures 1 and 2;

Figure 4 is a view similar to Figure 1 but showing a modified form of the invention wherein the engine head provides what may be either an integral or detachable baffle for directing at least a portion of the incoming gases across the head of the exhaust valve;

Figure 5 is a horizontal sectional view taken on the line 5—5 of Figure 4;

Figure 6 illustrates a further modified form of the invention, the same being a fragmentary vertical sectional view through a portion of an engine head and block illustrating a pair of so-called "overhead" intake and exhaust valves with the latter having heat radiating fins, and there being illustrated a novel—(and preferably head-carried baffle)—arranged to direct over the exhaust valve head at least a portion of the incoming gases from the intake valve;

Figure 7 is a perspective view of one of the exhaust valves illustrated in Figure 6, and Figure 8 is a perspective view of the baffle shown in Figure 6.

Referring to the drawings by reference characters and turning first to the form of invention shown in Figures 1, 2 and 3, numeral 10 designates a portion of the block of a so-called L-head internal combustion engine having the removable head 11, the block 10, providing the seats 12 for the associated intake valve 14 and exhaust valve 13 whose stems are designated at 13′ and 14′, respectively.

Numeral 15 denotes the exhaust passage which is controlled by exhaust valve 13 while 16 refers to the fuel intake passage controlled by intake valve 14. The operation of the valves is conventional and, except as hereinafter noted, the valves and associated parts are, or may be, standard.

Figure 3 shows the head of the exhaust valve 13 as having a lineally slotted—(17a)—cylindrical heat radiating extension 17 working in an aligned recess or hole 18 in the removable engine head 11. One of the head or block portions 11, 10,—as may be most convenient,—is shown in Figure 2 as providing a vertical baffle 19 which is interposed in the combustion chamber 21 as a partition between the intake valve 12 and the cylinder 20 with which valves 13, 14 are associated. Since the outer end of the baffle 19 terminates short of the remote wall of the combustion chamber 21 the relatively cool incoming gases from the intake passage 16 are caused to contact both the upper surface of the head of exhaust valve 13 and its heat radiating extension 17.

It will be evident from the foregoing that such incoming gases will very materially reduce the temperature of said exhaust valve 13. Furthermore it will be readily understood that the provision of the slotted extension 17 working in the hole 18 in the head 11 not only absorbs much heat from valve 13 by will also effect the transmission to head 11, by radiation and/or contact, of much of the heat received from exhaust valve 13.

Particular attention is directed to the fact that the slot 17a in exhaust valve extension 17 opens toward the incoming cooling gases from intake passage 16 and intake valve 14. This makes for accelerated cooling of such extension 17 and likewise of exhaust valve 13. However, of perhaps greater importance, is the fact that slot 17a prevents extension 17 from compressing gases in hole 18 which would reduce speed at which valve could be worked.

Baffle 19 may be apertured—(19a)—if desired to admit of more direct passage of the incoming gases to the cylinder 20 than about the end of baffle 19, and also to facilitate combustion of gases in the combustion chamber by making it unnecessary for the flame of the combustion to detour around the baffle.

Figures 4 and 5 illustrate a modified form of the invention as applied to an L-head motor and differs from the form shown in Figures 1 and 2 only in that a baffle 22 of a form different from that of baffle 19 (Figs. 1 and 2) is illustrated.

Baffle 22 of Figures 4 and 5 may be made integral with either the head or block 10 and 11 or may be fixedly or separably connected to either of same. Said baffle 22, as in the case of baffle 19 (Figs. 1 and 2) extends from one wall of valve containing portion of the combustion chamber 21a between the intake valve 14a and the cylinder, and terminates short of the opposite wall of such chamber 12a. There is preferably provided a hole 23 adjacent the inner end of baffle 22 for the direct passage to cylinder 20a of some of the incoming gases. Exhaust valve 13a preferably has a slotted heat radiating extension 17, 17a similar to that of Figures 1 and 2 and working in a hole 18a in head 11a.

Figure 4 illustrates hole 18a as having an enlargement 18b, at its exterior end to receive valve 13a when it is raised so that the latter will be shielded from the hot exhaust gases on the exhaust stroke of the piston.

Furthermore, the outer end of baffle 22 has the inwardly extending slot 24, which is preferably V-shaped as shown, and forms the wings 25, 26 at the outer end. The lower wing 25 is the shorter of the two and preferably has its lower edge flush or substantially flush with the bottom of the chamber 21a. This lower wing 25 is also preferably inclined slightly toward the exhaust valve 13a. Thus some of the relatively cool incoming gases (viz: those adjacent the bottom of the chamber 21)—will be directed over the adjacent exhaust valve 13a to cool same, while a certain proportion of the incoming gases will pass through V-slot 24 directly to cylinder 20a. Since the incoming gases from inlet valve 14a will be relatively cool a very substantial proportion of same will tend to keep to the lower part of the valve-occupied portion of chamber 21a and will not be affected by the upper wing 26 of the baffle 22.

The upper and longer wing 26 of the baffle 22 preferably has its upper edge flush or substantially flush with the top wall of chamber 21 and its inner end is also inclined inwardly toward exhaust valve 13.

Figures 6, 7 and 8 illustrate a further expression of the invention applied to an overhead valve type of internal combustion engine having the block 30, head 31, combustion chamber 32a, cylinder 32, piston 33, inlet valve 34, exhaust valve 35, exhaust passage 36 and intake passage 37.

Here the outer face of the exhaust valve 35 is shown provided with a plurality of heat radiating fins or ribs 35a. Opposite the inlet valve 34 and spaced between the same and the open end of cylinder 32 is the baffle 38 having the legs 39 whose feet 40 are secured as at 39a to the engine head 31 at opposite sides of the head-provided seat 41 of inlet valve 34. There is preferably provided a hole 42 in baffle 38 opposite inlet valve 34 so that at least a portion of the incoming gases from intake passage 37 may pass directly to cylinder 32 while another portion will be directed over the companion exhaust valve 35 to cool the same. The provision of the baffle hole 42 also facilitates combustion by obviating the necessity of the combustion flame detouring about baffle 38. As shown, the baffle 38 extends from approximately the wall of chamber 32a which is adjacent intake valve 34 to a point over the adjacent edge of the seat 35a of exhaust valve 35.

From the foregoing description taken in connection with the accompanying drawings the construction and operation of the invention will be readily understood and appreciated by those skilled in the art. Since the baffles 38 (Figs. 6 and 8) may be either integral or separate parts of either the block or head of the engine, the invention is susceptible of ready application to old engines as well as new ones. It is also a simple matter to bore a hole 18 in head 11—(or 11a)—for the heat radiating valve extension 17 of a valve such as 13 in Figures 1 and 2. Although heat radiating means is shown only in connection with the exhaust valves it goes without saying that same may be incorporated in the intake valves also in the exercise of my invention.

Having thus described my invention, what I claim as new is:—

1. An internal combustion engine, the combination with a cylinder, its combustion chamber and inlet and exhaust valves; of baffle means in said chamber and interposed between the inlet valve and cylinder whereby to direct relatively cool incoming inlet valve controlled gases over the exhaust valve to cool the same, said exhaust valve having heat radiating means within said combustion chamber interposed in the path of said incoming gases, a wall of said combustion chamber providing a receiving recess for at least a portion of said valve-carried heat radiating means whereby said wall will absorb heat from said valve through said heat radiating means, and said baffle having an opening opposite said inlet valve and communicating with the portion of said combustion chamber above said cylinder.

2. In an internal combustion engine, the combination with a cylinder, its combustion chamber and inlet and exhaust valves; of baffle means in said chamber and interposed between the inlet valve and cylinder whereby to direct relatively cool incoming inlet valve controlled gases over the exhaust valve to cool the same, and said baffle having an opening opposite said inlet valve and communicating with the portion of said combustion chamber above said cylinder.

3. In an internal combustion engine, the combination with its combustion chamber; of a valve in said combustion chamber providing a head, said head having a lineally split heat radiating extension.

4. In an internal combustion engine, the combination with its combustion chamber; of a valve in said combustion chamber providing a head, said head having a lineally split heat radiating extension, and a wall of said combustion chamber having a guide recess receiving said extension.

5. In an internal combustion engine, the combination with its combustion chamber; of a valve in said combustion chamber providing a head, said head having a lineally split heat radiating extension, a wall of said combustion chamber having a guide recess receiving said extension, an inlet valve supplying relatively cool gases to said combustion chamber at one side adjacent said first-mentioned valve, and baffle means in said combustion chamber arranged to direct said gases from said second valve over said first valve and against said extension thereof for cooling the same.

6. In an internal combustion engine, the combination with its combustion chamber; of a valve in said combustion chamber providing a head, said head having an axial extension, a wall of said combustion chamber having a guide recess receiving said extension, an inlet valve supplying relatively cool gases to said combustion chamber at one side adjacent said first-mentioned valve, and baffle means in said combustion chamber arranged to direct said gases from said second valve over said first valve and against said extension thereof for cooling the same.

7. In an internal combustion engine, the combination with its combustion chamber; of a valve in said combustion chamber providing a head, said head having a lineally split heat radiating extension, an inlet valve supplying relatively cool gases to said combustion chamber at one side adjacent said first-mentioned valve, and baffle means in said combustion chamber arranged to direct said gases from said second valve over said first valve and against said extension thereof for cooling the same.

8. In an internal combustion engine, the combination with its combustion chamber and adjacent intake and exhaust valves and cylinder; of a slotted heat radiating extension of said exhaust valve located within said chamber, said slot opening toward said inlet valve.

9. In an internal combustion engine, the combination with its combustion chamber and adjacent intake and exhaust valves and cylinder; of a slotted heat radiating extension of said exhaust valve located within said chamber, said slot opening toward said inlet valve, and baffle means in said combustion chamber interposed between the inlet valve and cylinder whereby to direct relatively cool incoming gases over the exhaust valve and against the heat radiating extension thereof.

10. In an internal combustion engine, the combination with its combustion chamber and adjacent intake and exhaust valves and cylinder; of a slotted heat radiating extension of said exhaust valve located within said chamber, said slot opening toward said inlet valve, baffle means in said combustion chamber interposed between the inlet valve and cylinder whereby to direct relatively cool incoming gases over the exhaust valve and against the heat radiating extension thereof, and a wall of said combustion chamber providing a guide recess receiving said heat radiating extension of said exhaust valve, and the walls of said guide recess absorbing heat from said exhaust valve extension.

11. In an internal combustion engine, the combination with its cylinder, combustion chamber, and inlet and exhaust valves, of baffle means interposed in said combustion chamber at one side between the inlet valve and cylinder having its outer end terminating short of the opposite side of said chamber, said baffle means providing a substantially medially located slot opening inwardly from its last-mentioned end for the substantially direct passage of incoming gases from said inlet valve to said cylinder, said slot forming upper and lower wings at the outer or second mentioned end portion of said baffle, the outer ends of said wings being curved toward the plane of said exhaust valve substantially as and for the purpose specified.

12. The combination with at least certain of the combustion chamber valves of an internal combustion engine; of heat radiating means extending from the heads of said valves, and a combustion chamber wall providing a receiving recess for housing both said valve heads and heat radiating means entirely within the wall whereby said wall will absorb heat from said valve both directly and through said heat radiating means, and whereby said valves and extensions will be substantially protected from hot gases on the exhaust stroke of the engine.

13. In an internal combustion engine the combination of an intake valve and exhaust valve with a means for directing the cool gases from said intake valve over and across said exhaust valve and a heat radiator mans projecting from said exhaust valve, whereby said both means operate to cool said exhaust valve.

14. In an internal combustion engine, the combination of an intake valve and exhaust valve with a means for directing the cool gases from said intake valve over and across said exhaust valve and a heat radiator means projecting from the surface of said exhaust valve into the path of said cool gases, whereby said both means operate to cool said exhaust valve.

15. In an internal combustion engine, the combination of an intake valve and an exhaust valve, with a director directing the comparatively cool gases from said intake valve over and across said exhaust valve whereby said exhaust valve is cooled, said exhaust valve having an extension thereon reaching into a wall of said engine whereby part of the heat of said exhaust valve is absorbed by said head.

16. In an internal combustion engine, the combination of an intake valve and exhaust valve, with a director directing the gases from said intake valve over and across said exhaust valve, whereby said exhaust valve is cooled, said exhaust valve having a plurality of extensions thereon reaching into a wall of said engine and whereby part of the heat of said exhaust valve is absorbed by said head.

17. In an internal combustion engine, the combination of an intake valve and exhaust valve, both of said valves being seated in the head of said engine, with a director directing substantially all of the gases from said intake valve over said exhaust valve, whereby said exhaust valve is cooled, said exhaust valve having a plurality of extensions thereon reaching into the combustion chamber of said engine, whereby part of the heat of said exhaust valve is absorbed by said head.

18. In an internal combustion engine, in combination, an intake valve, an exhaust valve in the path of gases from said intake valve, and heat radiating means projecting from said exhaust valve into the path of the cool intake valve gases.

19. In an internal combustion engine, an exhaust valve, a chamber housing said valve, a wall of said chamber having a recess in axial alignment with said exhaust valve, heat radiating extension means on the exhaust valve and reciprocable in said recess by operation of the valve, and said extension means having a relief outlet through which trapped gases are forced longitudinally of the extension as it moves inwardly of the recess.

20. In an internal combustion engine, a valve chamber, an intake valve therein, an exhaust valve therein in the path of gases from the intake valve, a wall of said chamber having a recess in axial alignment with said exhaust valve, a heat radiating extension on the exhaust valve and reciprocable in said recess by operation of the valve, and said extension being provided with an axial relief passage through which gases in the recess are forcibly expelled over and around the exhaust valve as said extension moves inwardly of the recess to displace its contained gases.

RAYMOND C. SCHLORF.